United States Patent Office 3,336,389
Patented Aug. 15, 1967

3,336,389
BIS(HALOTETRAFLUOROETHYL O - NITROSO-
HYDROXYLAMINES AND NITROXIDES AND
METHOD OF PREPARATION
William D. Blackley, Wappingers Falls, N.Y., assignor to Texaco Inc., New York, N.Y., a corporation of Delaware
No Drawing. Filed Apr. 13, 1964, Ser. No. 359,481
7 Claims. (Cl. 260—583)

This invention relates to novel stable paramagnetic (free radical) compounds and to their hydroxylamine precursors utilized in the preparation of the free radical compounds. More specifically, it is directed to bis(2-halotetrafluoroethyl)nitroxide and to O-nitroso-bis(2-halotetrafluoroethyl)hydroxylamine wherein the "halo" is a halogen other than fluorine.

The nitroxide compounds of the invention being paramagnetic in nature are useful as inhibitors in polymerization reactions, and therefore find particular suitability as stabilizers in amounts of 0.001 and 2 wt. percent in nylon, rubber and methacrylate compositions. The nitroxides also may be employed as antioxidants and free radical scavengers. The hydroxylamine intermediate is useful in the preparation of the nitroxide free radical product.

The O-nitroso-bis (2-halotetrafluoroethyl)hydroxylamine intermediate and bis(2-halotetrafluoroethyl)nitroxide paramagnetic product contemplated herein are respectively of the formulas:

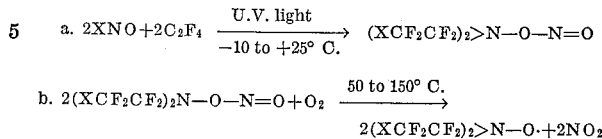

Hydroxylamine Intermediate     Nitroxide Product where X is a halogen selected from the group consisting of bromine, chlorine and iodine. Specific examples of the hydroxylamine intermediates and nitroxide paramagnetic products of the invention are O-nitroso-bis(2-chlorotetrafluoroethyl)hydroxylamine, O-nitroso-bis(2 - bromotetrafluoroethyl)hydroxylamine, O-nitroso - bis(2 - iodotetrafluoroethyl)hydroxylamine, bis (2-chlorotetrafluoroethyl) nitroxide, bis (2-bromotetrafluoroethyl)nitroxide and bis (2-iodotetrafluoroethyl)nitroxide.

The contemplated hydroxylamine intermediates and their nitroxide derivatives are prepared by first contacting tetrafluoroethylene with a nitrosyl halide of the formula XNO where X is as heretofore defined in the presence of ultraviolet light to form the hydroxylamine intermediate. Under advantageous conditions this first stage of the method is conducted at a temperature between about −10 and 25° C. in a mole ratio of tetrafluoroethylene to nitrosyl halide of between about 1:1 and 3:1. Under preferred conditions, the reaction is conducted under subatmospheric pressure conditions most preferably at between about 0 and 5 p.s.i.a. The total ultraviolet irradiation and reaction time is normally from about 12 to 72 hours.

The liquid O-nitroso-bis(2-halotetrafluoroethyl)hydroxylamine intermediate is recovered from the first stage of the method and heated in the presence of an oxygen containing gas such as air at a temperature between about 50 and 150° C. to form the bis(2-halotetrafluoroethyl) nitroxide and nitrogen dioxide by-product. The nitrogen dioxide is vented off and the liquid nitroxide free radical compound is recovered. Although higher and lower ratios may be employed, under preferred conditions oxygen is present in this second phase of the method in an oxygen to hydroxylamine mole ratio of between about 1:1 and 3:1.

The first and second phases of the reaction can be further described by the following equations.

a. $2XNO + 2C_2F_4 \xrightarrow[-10 \text{ to } +25° \text{ C.}]{\text{U.V. light}} (XCF_2CF_2)_2 > N-O-N=O$ b. $2(XCF_2CF_2)_2N-O-N=O + O_2 \xrightarrow{50 \text{ to } 150° \text{ C.}} 2(XCF_2CF_2)_2 > N-O \cdot + 2NO_2$ X is as heretofore defined.

The recovery of the hydroxylamine intermediate and nitroxide final product from their respective reaction mixtures can be accomplished by standard means. For example, in respect to the preparation of hydroxylamine intermediate the initial reactants are normally gases at the reaction temperature, and therefore, the liquid hydroxylamine product is easily separated from the gaseous reactants by obvious means such as venting off the unreacted gases. In regard to the nitroxide product, this product is normally liquid under the reaction temperatures and the nitrogen dioxide by-product is gaseous, and therefore, the separation can be also accomplished by venting. Further purification of the hydroxylamine intermediate and nitroxide final product can be accomplished by fractional distillation at atmospheric or reduced pressure.

Specific examples of the initial nitrosyl halide reactants contemplated herein are nitrosyl chloride, nitrosyl iodide and nitrosyl bromide.

Specific examples of sources for the ultraviolet light radiation are sunlight, mercury arc lamp, or hydrogen discharge lamp.

The following examples further illustrate the invention but are not to be taken as limitations thereof.

EXAMPLE I

To a 5-liter bulb there was pressured 6.5 grams of nitrosyl chloride and 10 grams of tetrafluoroethylene. The bulb was then stoppered and exposed to sunlight in an ice bath for a period of 2 days. The ice bath essentially maintained the reaction temperature conditions at 0° C. During the reaction period a brown liquid condensed at the bottom of the bulb. The total weight of the brown liquid collected was 10 grams. Based on infrared analysis, chemical reaction with methanol and the reaction of the nitroxide derivative (described in Example II) with nitric oxide to reform the brown liquid product, the brown liquid product was determined to be O-nitroso-bis(2-chlorotetrafluoroethyl)hydroxylamine of the formula:

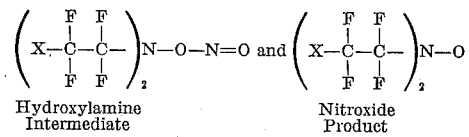

EXAMPLE II

To a 50 cc. Teflon flask there was added 33 grams of liquid O-nitroso-bis(2 - chlorotetrafluoroethyl)hydroxylamine prepared by the method of Example I. The hydroxylamine was heated to a temperature of 100° C. in the presence of an excess of oxygen (air) and the heating was continued until the evolution of nitrogen dioxide ceased. At the end of the heat treatment 21.6 grams of a purple liquid was recovered from the bottom of the flask. The purple liquid was fractionated and the fraction recovered at 92–94° C. was analyzed by gas chromatography, electron spin resonance, mass spectroscopy, infrared and nuclear magnetic resonance. These analyses determined the product to be bis(2-chlorotetrafluoroethyl)nitroxide of the formula:

$$\left( Cl-\underset{\underset{F}{|}}{\overset{\overset{F}{|}}{C}}-\underset{\underset{F}{|}}{\overset{\overset{F}{|}}{C}}- \right)_2 N-O$$

The found molecular weight of the nitroxide was 303.5±1.1 (Regnault). Calculated weight is 397. Its structure was further confirmed in that when contacted with equimolar amounts of nitric oxide at 25° C. it reformed its hydroxylamine precursor in accordance with the following equation:

$$(ClCF_2CF_2)_2NO\cdot + NO \rightarrow (ClCF_2CF_2)_2NONO$$

The nitroxide structure was still further confirmed in a fluorine analysis in that the theoretical fluorine content of bis(2-chlorotetrafluoroethyl)nitroxide is 50.5% and the found fluorine content was 49.9 wt. percent.

Bis(2-chlorotetrafluoroethyl)nitroxide does not react with air or oxygen at temperatures up to 100° C. It is reactive with acetone and benzene.

I claim:
1. A halotetrafluoroethyl compound selected from the group consisting of:

$$\left( X-\underset{\underset{F}{|}}{\overset{\overset{F}{|}}{C}}-\underset{\underset{F}{|}}{\overset{\overset{F}{|}}{C}}- \right)_2 N-O-N=O \text{ and } \left( X-\underset{\underset{F}{|}}{\overset{\overset{F}{|}}{C}}-\underset{\underset{F}{|}}{\overset{\overset{F}{|}}{C}}- \right)_2 N-O$$

where X is selected from the group consisting of bromine, chlorine and iodine.

2. O-nitroso - bis(2 - chlorotetrafluoroethyl)hydroxylamine of the formula:

$$\left( Cl-\underset{\underset{F}{|}}{\overset{\overset{F}{|}}{C}}-\underset{\underset{F}{|}}{\overset{\overset{F}{|}}{C}}- \right)_2 N-O-N=O$$

3. Bis(2 - chlorotetrafluoroethyl)nitroxide of the formula:

$$\left( Cl-\underset{\underset{F}{|}}{\overset{\overset{F}{|}}{C}}-\underset{\underset{F}{|}}{\overset{\overset{F}{|}}{C}}- \right)_2 N-O$$

4. A method of preparing a paramagnetic nitroxide product of the formula:

$$\left( X-\underset{\underset{F}{|}}{\overset{\overset{F}{|}}{C}}-\underset{\underset{F}{|}}{\overset{\overset{F}{|}}{C}}- \right)_2 N-O$$

comprising contacting tetrafluoroethylene with a nitrosyl halide selected from the group consisting of nitrosyl chloride, nitrosyl bromide and nitrosyl iodide in the presence of ultraviolet radiation at a temperature of between about −10 and 25° C. and a mole ratio of tetrafluoroethylene to nitrosyl halide of between about 1:1 and 3:1, recovering the formed O-nitroso-bis(2-halotetrafluoroethyl)hydroxylamine of the formula:

$$\left( X-\underset{\underset{F}{|}}{\overset{\overset{F}{|}}{C}}-\underset{\underset{F}{|}}{\overset{\overset{F}{|}}{C}}- \right)_2 N-O-N=O$$

where X is as heretofore defined, heating said recovered hydroxylamine at a temperature between about 50 and 150° C. in the presence of oxygen to form said paramagnetic nitroxide.

5. A method in accordance with claim 4 wherein X is chlorine and the ultraviolet light radiation source is sunlight.

6. A method of preparing O-nitroso-bis(2-halotetrafluoroethyl)hydroxylamine of the formula:

$$\left( X-\underset{\underset{F}{|}}{\overset{\overset{F}{|}}{C}}-\underset{\underset{F}{|}}{\overset{\overset{F}{|}}{C}}- \right)_2 N-O-N=O$$

where X is selected from the group consisting of chlorine, bromine and iodine comprising contacting tetrafluoroethylene with a nitrosyl halide of the formula:

XNO where X is as heretofore defined in the presence of ultraviolet radiation at a temperature between about −10 and 25° C., at a mole ratio of tetrafluoroethylene to nitrosyl halide of between about 1:1 and 3:1.

7. A method in accordance with claim 6 wherein X is chlorine and said ultraviolet light radiation is sunlight.

No references cited.

CHARLES B. PARKER, *Primary Examiner.*

P. RAYMOND, *Assistant Examiner.*